United States Patent [19]

Reese et al.

[11] Patent Number: 4,894,080
[45] Date of Patent: Jan. 16, 1990

[54] IN-LEHR GLASS SHEET PRESS BENDING USING PRESSURIZED GAS

[75] Inventors: Thomas J. Reese, Buffalo Township, Butler County; Joseph J. Fisher, Oakmont, both of Pa.

[73] Assignee: PPG Industries, Inc., Pittsburgh, Pa.

[21] Appl. No.: 248,679

[22] Filed: Sep. 26, 1988

[51] Int. Cl.⁴ .......................................... C03B 23/023
[52] U.S. Cl. ..................................... 65/106; 65/107; 65/273; 65/287; 65/289
[58] Field of Search ................ 65/107, 106, 273, 287, 65/289

[56] References Cited

U.S. PATENT DOCUMENTS

| | | |
|---|---|---|
| 2,123,552 | 7/1938 | Helwig .............................. 65/287 X |
| 2,131,873 | 10/1938 | Goodwillie . |
| 2,570,309 | 10/1951 | Black . |
| 3,068,672 | 12/1962 | Black . |
| 3,208,839 | 9/1965 | Nordberg . |
| 3,408,173 | 10/1968 | Leflet, Jr. . |
| 3,582,454 | 6/1971 | Giffen . |
| 3,976,462 | 8/1976 | Sutara . |
| 4,260,408 | 4/1981 | Reese et al. . |
| 4,260,409 | 4/1981 | Reese et al. . |
| 4,265,650 | 5/1981 | Reese et al. . |
| 4,272,275 | 6/1981 | Reese . |
| 4,274,858 | 6/1981 | Claassen et al. . |
| 4,290,796 | 9/1981 | Reese et al. . |
| 4,305,746 | 12/1981 | Hagedorn et al. . |
| 4,597,789 | 7/1986 | Reese . |
| 4,756,735 | 7/1988 | Cathers et al. . |

*Primary Examiner*—Arthur Kellogg
*Attorney, Agent, or Firm*—Andrew C. Siminerio

[57] ABSTRACT

Glass sheets are positioned on a shaping rail of an outline shaping mold form movement through a heating lehr and subsequent preliminary sag bending. The mold with the glass sheet supported thereon is positioned between a pair of vertically aligned pressing molds. The lower mold includes a full surface press face corresponding to the final desired curvature of the glass sheet to be shaped. The upper mold includes a peripheral shaping surface and a chamber defined by the shaping surface. After the lower mold lifts the glass sheet off the outline mold and into engagement with the upper mold, gas in the chamber is pressurized to urge those portions of the glass not contacted by the upper mold against the press face of the lower mold.

14 Claims, 3 Drawing Sheets

IN-LEHR GLASS SHEET PRESS BENDING USING PRESSURIZED GAS

BACKGROUND OF THE INVENTION

1. Field of the Invention

This invention relates to shaping heat softened glass sheets, and in particular, to shaping pairs of glass sheets to a curved configuration by a combination of preliminary gravity sag bending on an outline mold, and final press bending between an upper ring press and a vertically aligned, full surface lower press face using pressurized gas to supplement shaping.

2A. Technical Consideration

One common technique for shaping a glass sheet is to support the sheet on an outline bending mold having a shaping rail with an upper surface having elevational contours corresponding to the final desired shape of the glass sheet. The glass sheet is heated to its heat softened temperature and sagged by gravity to assume the desired configuration. This technique is particularly well suited for simultaneously shaping two sheets of glass, or doublets, that will be used as the inner and outer plies of conventional laminated glass, for example a windshield.

As glass sheet configurations become more complex and include deeper bend sections, the shaping rails may be segmented and made to pivot from an open, rigid sheet supporting position to a closed, heat softened glass sheet supporting position. In the closed position, the shaping rails assume the desired elevational contours of the glass sheet to be shaped slightly inboard of its perimeter.

In addition, pressing molds may be used to shape glass doublets to complex and complicated configurations by pressing the glass sheets between a pair of aligned, full surface press faces. When pressing molds are used in conjunction with an outline mold, the lower mold generally moves upward through the rail of the outline mold, lifting the glass sheet off of the outline mold and presses it against a complementing upper mold. However, when the surface of heat softened glass is contacted by a pressing surface, there is a risk of marking the contacted surface.

It would be advantageous to provide a bending arrangement wherein glass sheets can be preliminarily shaped on an outline bending mold and then pressed between a pair of bending molds to impart a final configuration while minimizing the surface contact between glass sheets and the press face surfaces.

2B. Patents of Interest

U.S. Pat. No. 2,131,873 to Goodwillie shapes one or a pair of glass sheets by supporting the glass sheets on an upwardly facing concave shaping surface of a solid lower mold, allowing the glass sheets to sag by gravity to conform to the shaping surface, and pressing the sheets between the lower mold and an upper solid mold having a complementary convex shaping surface. The glass sheets remain on the lower mold throughout the sagging and press bending operation.

U.S. Pat. No. 2,570,309 to Black sag bends a glass sheet by heating it while supporting the sheet on an outline ring-type mold to conform to the mold by gravity sagging. The gravity sagged glass sheet is then lifted on a lower solid pressing mold of concave elevation into pressing engagement against an upper solid pressing mold of complementary shape. The bent glass sheet is returned to the outline ring-type mold to support the bent glass sheet during quenching.

U.S. Pat. Nos. 3,068,672 to Black; 3,408,173 to Leflet; 3,976,462 to Sutara; and 4,597,789 to Reese disclose outline metal molds for shaping a glass sheet of non-rectangular outline to a nonuniform shape by gravity sag bending. Black, Sutara and Reese each further disclose a sectionalized outline metal mold for the gravity sag bending.

U.S. Pat. No. 3,208,839 to Nordberg press bends as many as three glass sheets to conforming shapes simultaneously using press bending techniques exclusively for the shaping process.

U.S. Pat. No. 3,582,454 to Giffen teaches a glass article forming and trimming apparatus. Layered glass is clamped between a pair of molds and a blow head admits fluid into the cavity between the molds to force the glass into conformity with the surface of one of the mold surfaces. A trimmer penetrates the periphery of the glass to cut the glass to shape.

U.S. Pat. Nos. 4,260,408, 4,260,409, 4,265,650 and 4,290,796 to Reese et al. and 4,272,275 to Reese disclose the simultaneous shaping of a pair of glass sheets having a non-rectangular outline of nonuniform curvature by combination of gravity sag bending and press bending to a complicated shape using full surface, vertically aligned press faces.

U.S. Pat. No. 4,274,858 to Claassen et al. teaches a vertical press bending operation wherein glass is pressed between an adjustable, peripheral shaping member and a full surface press face. The adjustable member is adjustably secured to a rigid plate to adjust its shape.

U.S. Pat. No. 4,305,746 to Hagedorn et al. teaches the shaping of a glass sheet by using a lower press ring to lift a glass sheet against an upper mold face. Shaping pads within the outline of the ring lift the central portion of the glass sheet and press it against the upper shaping mold.

SUMMARY OF THE INVENTION

The present invention provides a method and apparatus for shaping heat softened glass sheets utilizing a full surface, lower press face and an upper pressing ring that sandwiches the peripheral edge portion of the heat softened glass sheet between the pressing ring and a corresponding complimenting peripheral portion of lower full surface shaping mold. The pressing of the peripheral portion of the glass sheet ensures conformance of the glass sheet perimeter to the desired shaped configuration. The glass sheet is preliminarily gravity sag bent on an outline bending mold and thereafter lifted off the outline mold by the lower press surface and into contact with the upper shaping ring. The heat softened glass sheets sags to conform to the shaping surface of the lower press face. In a preferred embodiment of the invention, the pressing ring forms a plenum which is filled with pressurized gas when in pressing engagement with the glass sheet to urge those portions of the heat softened glass sheet not contacted by the pressing ring against the contoured surface of the lower press face. This compressed gas may be hot air drawn from within the heating lehr prior to the shaping operation or maybe pressurized gas from an independent air source.

The present invention provides for shaping of heat softened glass sheets to complicated shapes while minimizing actual contact between one major surface of the glass sheet and a contoured shaping surface.

BRIEF DESCRIPTION OF THE DRAWING

FIG. 1, comprising FIG. 1a shows the upstream section and FIG. 1b shows the downstream section.

DETAILED DESCRIPTION OF THE INVENTION

The present invention relates to shaping heat softened glass sheets and in particular to simultaneous shaping of doublets for a windshield but it is understood that the invention may be used to shape any number of sheets of any heat softenable sheet material where it is desired that the sheet be precisely and accurately shaped and marking of the sheet due to shaping be minimized.

Figure 1A:
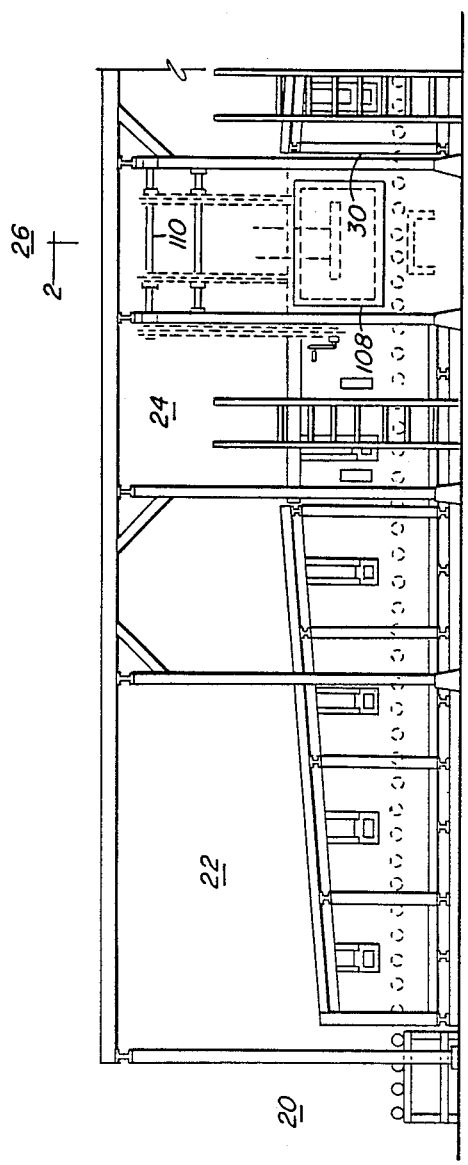
FIGS. 1a and 1b, is a longitudinal side view of a glass sheet bending lehr arrangement in accordance with the present invention.
Figure 1B:
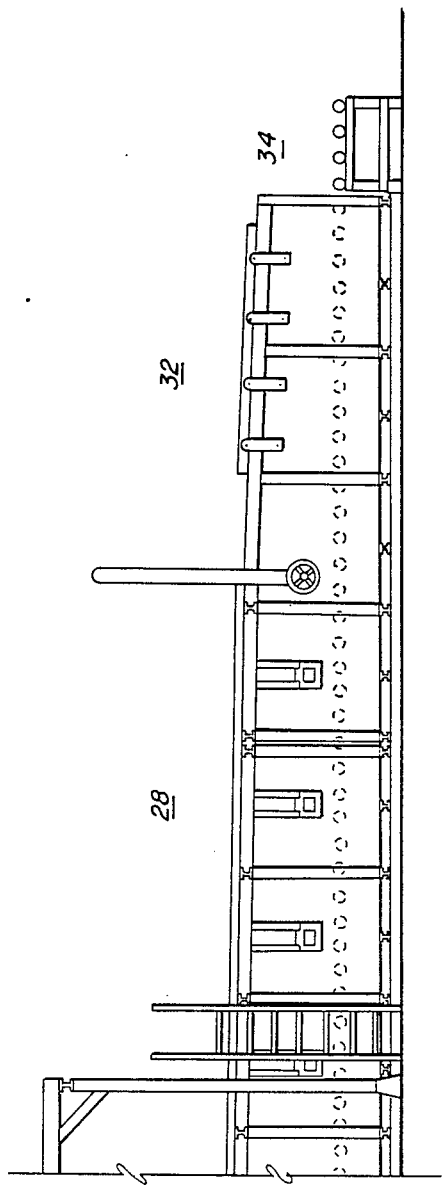

FIGS. 1a and 1b depict a heating, shaping and annealing lehr for shaping glass sheets according to the present invention. The lehr begins downstream at a loading zone 20 and includes a heating zone 22 of tunnel type configuration, a gravity bending zone 24 downstream of the heating zone 22, a press bending or shaping station 26 immediately beyond the gravity bending zone 24, an annealing zone 28 which may include a door 30 beyond the shaping station 26, and a cooling zone 32 in end to end relation in a downstream portion of the lehr. An unloading zone 34 is beyond the cooling zone 32.

Figure 2:
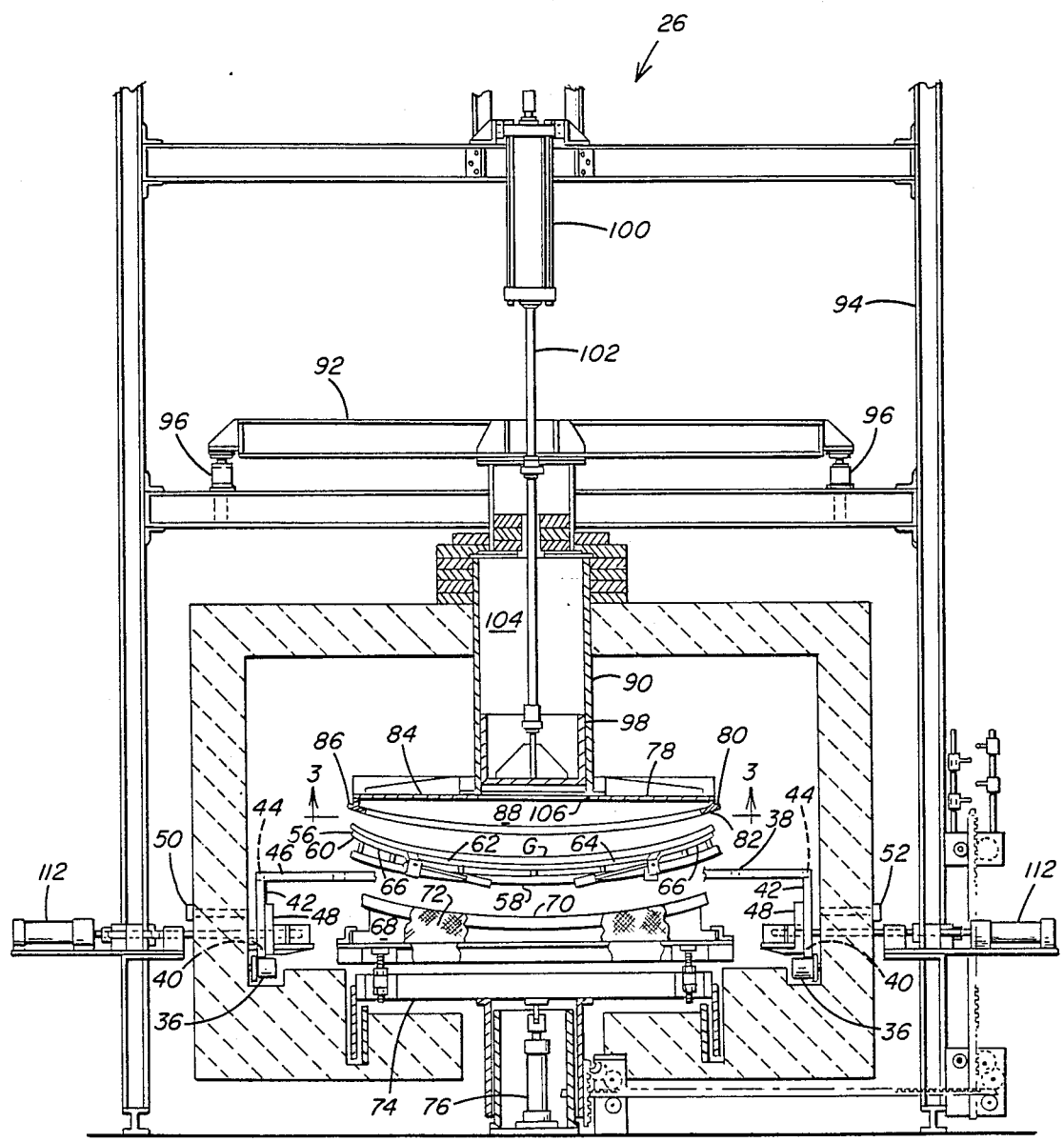
FIG. 2 is a view taken along the line 2—2 of FIG. 1, showing a transverse elevation of the press bending station of in the lehr arrangement shown in FIG. 1 which incorporates the novel features of the present invention and includes an outline mold, a lower pressing mold depicted in its lowered position, and an upper ring mold.

Referring to FIG. 2, a conveyor comprised of a plurality of pairs of stub rolls 36 disposed in transversely opposing longitudinally spaced relation, extends the entire length of the lehr and defines a path of movement along a longitudinal reference line. Each stub roll 36 is mounted on a shaft that extends through a side wall of the lehr and is connected to a conveyor drive (not shown). A mold return conveyor (not shown) extends along the entire lehr. The conveyor may be divided into a number of sections, driven from its own drive means through conventional drive rod and gear means or chain drives or the conveyor sections may be driven from a common drive through clutches in a manner well known in the art.

A plurality of mold support carriages 38 (one only shown in FIG. 2), similar to the support carriage taught in U.S. Pat. No. 4,756,735 to Cathers et al. which teachings are incorporated by reference, are conveyed along the conveyor by rotational engagement of the stub rolls 36 with a pair of longitudinally extending support rails 40 at each end of the carriage 38. Uprights 42 connect the rails 40 to a pair of upper longitudinal rails 44. A pair of upper transverse rails 46 interconnect the upper longitudinal rails 44 of the carriage 38. One upright 42 along each longitudinal side edge of the carriage 38 is provided with an apertured plate 48. The apertures in the plates 48 are arranged to be aligned between a signal transmitting device 50, such as a laser, and a signal receiving device 52, such as a photoelectric cell, both of which are positioned along opposing sidewalls of the lehr, whenever the carriage 38 is orientated aligned and positioned correctly within the press bending station 26.

An outline mold 56 and support frame 58 are mounted on the carriage 38. The mold 56 includes shaping rail member 60 having a supporting surface 62 that conforms in elevation and outline to the longitudinal and transverse elevational shape desired for a glass sheet G to be bent, slightly inboard of the glass sheet perimeter. Although not limiting in the present invention, the mold 56 illustrated in FIG. 2 may be an articulating shaping mold similar to that disclosed in U.S. Pat. No. 4,597,789 to Reese, which teachings are herein incorporated by reference, and includes a stationary central portion 64 and a pair of opposed, pivoting end mold wing sections 66. The outline mold 56 is positioned relative to the carriage 38 so that the mold's geometric center is aligned with the predetermined, vertical axis when the outline mold 56 occupies an operating position at the press bending station 26, as will be discussed later.

With continued reference to FIG. 2, the press bending station 26 comprises a lower pressing mold 68 that includes an upper press face 70 whose surface covers a continuous area corresponding to the final curved shape of a major portion of the glass sheets. The press face 70 which is shown to be a ceramic surface may be any type of high temperature resistant material, such as steel, and is provided with a flexible fabric material cover 72 that does not mar a hot sheet, e.g., fiber glass cloth.

The lower mold 68 is preferable positioned on a frame 74 with its geometric center along a fixed vertical axis that coincides with the geometric center of the press bending station 26. A lower piston 76, which is adapted to move vertically parallel to the vertical axis at the geometric center of the press face 70 of the lower pressing mold 68, is connected to the frame 74 to raise and lower the lower pressing mold 68 in a vertical direction. When the lower piston 76 moves the lower pressing mold 68, the geometric center of the press face 70 moves along the fixed vertical axis at the geometric center at the press bending station 26.

Figure 3:
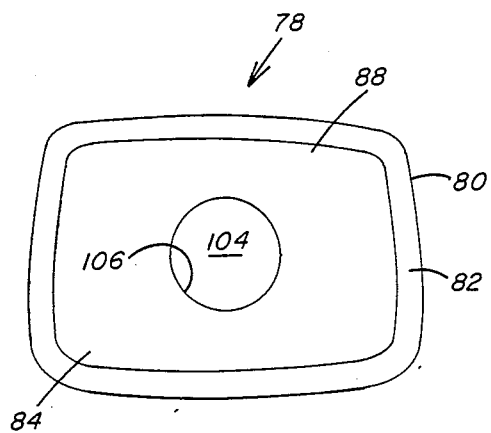
FIG. 3 is a view of the upper mold of the present invention along line 3—3 of FIG. 2, illustrating the upper ring mold and pressure chamber.
Figure 4:
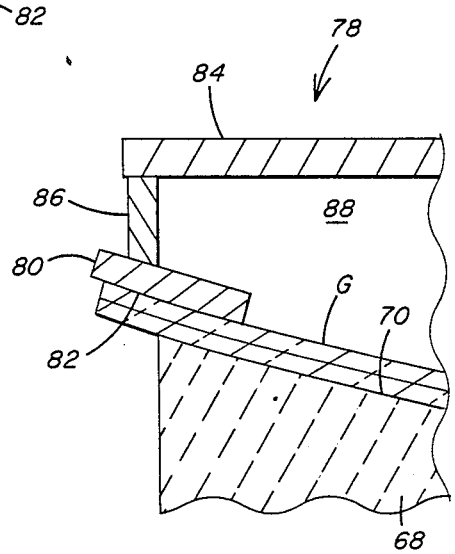
FIG. 4 is an enlarged view of a portion of the ring mold showing a glass sheet pressed between the upper ring mold and the lower full surface mold.

Referring to FIGS. 2, 3, and 4, the press bending station 26 also includes an upper press bending mold 78 comprising a peripheral pressing ring 80 that defines a downwardly facing shaping surface 82 about the periphery of the glass sheet G to be shaped that complements the underlying upwardly facing shaping surface defined by the peripheral position of the ceramic press face 70 of the lower pressing mold 68. The upper pressing mold 78 is supported in a position, such that its geometric center intersects the vertical axis of movement for the geometric center of the press face 70 of the lower pressing mold 68, so that the downwardly facing shaping surface 82 defined by the press ring 80 is orientated and aligned over the upwardly facing shaping surface defined by press face 70. Ring 80 is supported from rigid plate 84 by web member 86, forming a plenum 88 within upper mold 78 as will be discussed later. Plate 84 is mounted on cylinder 90 which is supported from beam 92 of overhead frame 94. Screw jacks 96 at opposing ends of beam 92 vertically position and level ring 80 relative to the lower mold 68 and outline mold 56.

With continued reference to FIG. 2, slide 98 is positioned within cylinder 90 and is secured to piston 100 which vertically reciprocates the slide 98. As piston 100 withdraws its arm 102, slide 98 moves upward within cylinder 90, drawing preheated fluid, and in particular, ambient temperature air from within the lehr, into chamber 104 of the cylinder 90 through opening 106 of the plate 84. As arm 102 move out from piston 100, slide 98 moves downward within cylinder 90, expelling the air, as will be discussed later.

Ring 80 preferably extends beyond the peripheral edge of the glass sheet G as shown in FIG. 4. The width of ring 80 is preferably wide enough to press the glass sheet G out to its peripheral edge while also sealing the glass edge between surfaces 70 and 82. In this fashion, the physical contact between the upper surface of glass sheet G and press ring 80 is minimized. However, it should be appreciated that ring 80 width may be extended inwardly to press selected portions of the glass sheet G in the vicinity of the peripheral edge between complimenting upper and lower pressing surfaces.

A mold cover (not shown) of a material similar to that provided for the lower pressign mold 68 may also be provided for the pressing surface 82 of pressing ring 80.

Access to the press bending station 26 is provided by a slide door 108 (FIG. 1a). Lifting and lowering means 110 is provided to open and close the slide door 108 when access to the press bending station 26 is needed.

CYCLE OF OPERATION

The operating sequence for the bending lehr as described earlier is similar to that disclosed in U.S. Pat. No. 4,290,796. A pair of glass sheets of curved outline and with suitable parting material therebetween is positioned in a substantially horizontal orientation on the outline mold 56 of the mold supporting carriage 38 at the loading zone 20. The carriage 38 is transversely aligned relative to a longitudinal reference line through the lehr by positioning the rails 40 on the stub rolls 36. The carriage 38 passes through the heating zone 22 of the lehr where heating elements are arranged to provide a pattern of heating both longitudinally and transversely of the path of travel for the glass supporting mold 56 through the lehr. By the time the mold 56 arrives at the gravity bending station 24 (maintained at an ambient temperature range of about 1080° F. to 1150° F. [582° C. to 621° C.]), the glass sheets have been heated to their deformation temperature (between 1070° F. and 1125° F. [577° C. to 607° C.]) and sag to a preliminary configuration. In addition, end sections 66 rotate upward to further shape the glass sheets.

During passage of the outline mold 56 from the loading zone 20 to the press bending station 26, it may lose its approximately proper alignment in orientation with respect to the longitudinal reference line. However, because the glass sheets have non-rectangular outlines of nonconform curvature in plan and are bent to complicated shapes, it is essential that the shapes be oriented and aligned exactly when they arrive at the press bending station 26. It is also important that the outline mold 56 be properly aligned above the lower pressing mold 68 to avoid mold damage. The apertured plates 48 mounted on the carriage 38 intercept the laser beam when the carriage 38 is improperly placed or misorientated at the press bending station 26 to stop further operation until the apertures in both plates 48 are in the path of the laser beam. The support carriage 38 with the mold 56 positioned thereon is repositioned to align the geometric center of the mold 56 and glass sheet G between molds 68 and 78 by an alignment device 112, such as for example that taught in U.S. Pat. No. 4,290,796 to Reese et al., which teachings are incorporated by references.

The pressing molds 68 and 78 are maintained at a designated elevated temperature in the press bending station 26. Elevated mold temperatures enhance the ability of the pressing molds to complete the shaping of the glass and reduce the likelihood of chill cracking in the glass, a phenomenon associated with colder molds. The pressing molds are at an elevated temperature that approximates the ambient temperature in the press bending station 26.

After mold 56 with the glass sheets supported thereon is aligned, lower piston 76 moves the lower pressing mold 68 to lift the glass sheet off the outline mold 56 and support the glass sheet during their engagement with the upper pressing mold 78. Prior to or as the lower mold 68 lifts the glass sheets G off the mold 56, piston 100 retracts arm 102 so that slide 98 draws ambient temperature air into chamber 104. Mold 68 then presses glass sheets G against upper ring 88 to press the periphery of the glass sheets to the desired configuration and to form a seal about the glass sheets' peripheral edge.

When piston 76 is extended and while the ring 80 is sealingly engaged with glass sheets G, as shown in FIG. 4, piston 100 extends arm 102, compressing the air within chamber 104 and plenum 88 to urge those portions of the glass sheet G not contacted by the ring 80 against the press face 70 of the lower press 68. As a result, the glass sheet G conforms to the contour of the press face 70 while not physically contacting the major portion of the glass sheets' upwardly facing major surface and marking of the upper glass surface in the central portion of the glass sheet G is eliminated. The amount of pressure within chamber 104 and plenum 88 is controlled by the stroke of cylinder 100. A timer (not shown) is actuated to hold the pressing molds in position and maintain pressure within chamber 104 and plenum 88 to ensure the imposition of the desired curved configuration. The timer also controls the start of the return of the lower pressing mold 68 to its lower position.

After pressing and shaping the glass sheets between the molds 68 and 78, the lower pressing mold 68 moves downward with the shaped glass sheet G supported thereon. If desired, a relief valve (not shown) may be positioned to vent the pressurized air from plenum 88 and/or chamber 104 after shaping is complete and prior to the downward movement of lower mold 68. As the mold 68 continues downward, it redeposits the shaped glass sheets G on shaping rail 60.

When lower mold 68 is fully lowered, the lehr door 30 opens and the conveyor rolls 36 are activated to convey the shaped glass sheets G and mold 56 out of the shaping station 26 into the annealing zone 28. Door 30 is then closed for next bending and shaping cycle.

Once the glass sheets have been shaped in the pressing station 26, it is necessary that they retain their conforming shapes in the annealing zone 28 until cooled from within the deformation temperature range to below the strain point of the glass, which for float glass is approximately 950° F. (510° C.). To ensure conformance of the glass sheets to the desired shapes, it is essential that they be cooled at a slow rate of cooling to below the strain point. The maximum rate of cooling that avoids excessive permanent warpage between the glass sheet depends upon the glass sheet thickness. After annealing, the glass sheets pass into the cooling zone 32 for additional cooling.

It should be appreciated that the reciprocating movement of slide 98 to compress the air in chamber 104 may be eliminated by using a compressed gas source (not shown) to feed gas directly into chamber 104 and/or plenum 88. If an alternate compressed gas source is used, it is preferable that the gas be heated so as to avoid any thermal shock to the glass sheets by contacting them with gas at a temperature below that which it was exposed to prior to heating.

Although the preferred embodiment of the invention uses compressed air to help shape the glass sheet G, the upper mold 78 with a press ring 80 as taught in the present invention may be used to press glass sheets without utilizing a compressed gas. With such an arrangement the preliminarily sag bent glass would be lifted from the rail member 60 of mold 56 by lower mold 68 and pressed against ring 80 while the central portion of the shape sags by inertia and gravity to conform to the shape of press face 70.

Figure 5:
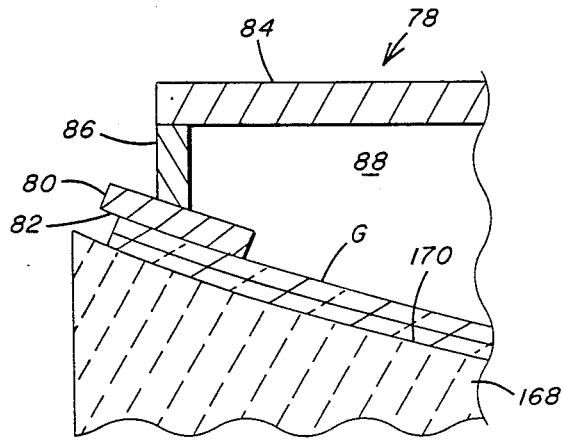
FIG. 5 is a view similar to FIG. 4 showing the pressing of a glass sheet with a lower mold that extends beyond the glass sheet perimeter.

The present invention may also be used in conjunction with an expandable outline mold 56 as taught in U.S. Pat. No. 4,756,735 which allows a lower press face 170 of a mold 168 to extend beyond the peripheral edge of the glass sheet G. With this type of arrangement the periphery of the glass sheets G are fully pressed its outer edge, as shown in FIG. 5.

As can be appreciated from the teachings of this invention, the pressurized gas provides a generally uniform force to the heat softened glass sheet G to urge it toward press face 70 without marking its upper surface. It is obvious that addition baffles, ducts and/or pressurized air line can be incorporated into said plenum 95 to provide additional localized forces to selected portions of the glass sheet G as required.

The form of the invention shown and described in this disclosure represents an illustrative embodiment thereof. It is understood that various changes may be made without departing from the teachings of the invention defined by the claimed subject matter which follows.

We claim:

1. An apparatus for shaping heat softened sheet material to a predetermined shape comprising:
   a first mold having a full surface press face and a shaping surface contoured to generally correspond to the final desired curvature of said sheet to be shaped;
   a second mold having a peripheral shaping surface corresponding to the final desired contour of the periphery of the sheet to be shaped and complimenting a corresponding portion of said shaping surface of said first mold, and a chamber defined by said peripheral shaping member;
   means to support and position said sheet to be shaped;
   means to position said support means between said first and second molds;
   means to move said first and second molds and said support means relative to each other to lift said sheet off said support means and engage said sheet between said first and second molds; and
   means to apply a fluid force to a central portion of said sheet to be shaped to urge said sheet toward said first mold press face when said sheet is engaged between said molds.

2. The apparatus as in claim 1 wherein said means to apply a fluid force includes means to pressurize fluid within said chamber.

3. The apparatus as in claim 2 wherein said fluid is a gas and further including means to preheat said pressurized gas.

4. The apparatus as in claim 3 wherein said pressurizing means includes a duct in communication with said chamber, a slide member positioned within said duct and means to move said slide member in first direction when said second mold is spaced from said heat softened sheet, wherein gas is drawn into said chamber and a second direction when said molds are in said engaging position wherein said gas is pressurized within said chamber to urge said sheet to be shaped against said lower mold press face.

5. The apparatus as in claim 4 wherein said support and positioning means includes an outline sheet supporting mold having sheet engaging surfaces corresponding to the desired shape and elevational contour of said sheet inboard of the sheet perimeter and means to locate said sheet and outline mold between said upper and lower.

6. The apparatus as in claim 1 wherein said first mold is a lower mold and said second mold is an upper mold and further wherein said first mold is vertically aligned with said second mold.

7. An apparatus for shaping heat softened sheet material to a predetermined shape comprising:
   a first mold having a full surface press face with a shaping surface contoured to generally correspond to the final desired curvature of said sheet to be shaped;
   a second mold having a peripheral shaping surface corresponding to the final desired curvature of the periphery of the sheet to be shaped and complimenting a corresponding portion of said shaping surface and said first mold;
   means to support said sheet to be shaped;
   means to position said support means between said first and second molds;
   means to move said first and second molds and support means relative to each other to lift said sheet off said support means and engage said sheet between said first and second molds; and
   means to allow said heat softened sheet to sag into contact with said first mold press face while said molds engage said sheet.

8. A method of shaping heat softened sheet material comprising:
   supporting said heat softened sheet material on a support means;
   positioning said sheet and support means between a first mold having a full surface press face with a surface contour corresponding to the final desired curvature of said sheet to be shaped and a second mold having a peripheral shaping surface corresponding to the final desired curvature of said sheet to be shaped about its periphery and a chambered defined by said peripheral shaping surface;
   moving said first and second molds and said support means relative to each other to lift said sheet off said support means and engage said sheet between said first and second molds; and providing a fluid force within said chambered to urge central portions of said sheet toward said first mold.

9. The method as in claim 8 wherein said providing step includes pressurizing fluid within said chamber.

10. The method as in claim 8 wherein said providing step includes drawing gas into said chamber prior to engaging said sheet between said molds and pressure rising said gas within said chamber while engaging said sheet between said molds.

11. The method as in claim 10 further including the step of heating said gas prior to said pressurizing step.

12. The method as in claim 11 wherein said supporting step includes supporting said sheet on an outline mold having a shaping rail with plan outline corresponding to the shape of said sheet and having an upper shaping surface corresponding to the elevational contour of said sheet slightly inboard of said sheet perimeter.

13. The method as in claim 12 wherein said moving step includes moving said first mold relative to said outline mold such that said press face passes through said shaping rail to lift said sheet from said upper shaping surface of said shaping rail and into engagement with said second mold.

14. A method of shaping heat softened sheet material comprising:
  supporting said heat softened sheet material on a support means;
  positioning said sheet and support means between a first mold having a full surface press face with a surface contour corresponding to a final desired curvature of said sheet to be shaped and a second mold having a peripheral shaping surface corresponding to a final desired curvature to said sheet to be shaped about its periphery;
  moving said first and second molds and said support means relative to each other to lift said sheet off said support means and engage said sheet between said first and second molds; and
  allowing said heat softened sheet to sag into contact with said first mold press face while said molds engage said sheet.

* * * * *

UNITED STATES PATENT AND TRADEMARK OFFICE
CERTIFICATE OF CORRECTION

PATENT NO. : 4,894,080

DATED : January 16, 1990

INVENTOR(S) : Thomas J. Reese et al.

It is certified that error appears in the above-identified patent and that said Letters Patent is hereby corrected as shown below:

Claim 10, line 3, delete "pressure" and insert --pressurizing--; and Line 4, delete "rising".

Signed and Sealed this

Eighth Day of January, 1991

Attest:

HARRY F. MANBECK, JR.

*Attesting Officer*  *Commissioner of Patents and Trademarks*